F. W. CARLSON.
CLOSET CONNECTION.
APPLICATION FILED MAY 19, 1909.
962,621. Patented June 28, 1910.
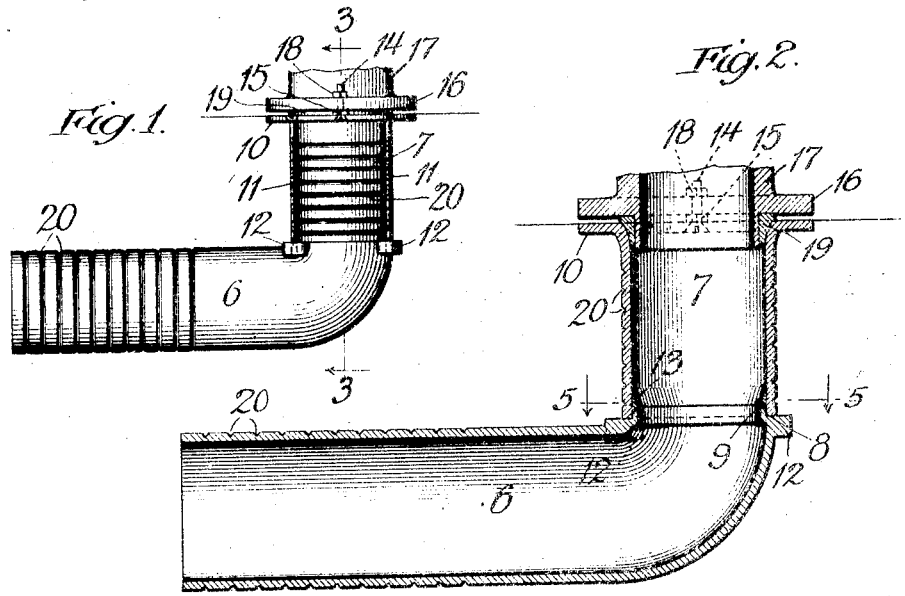
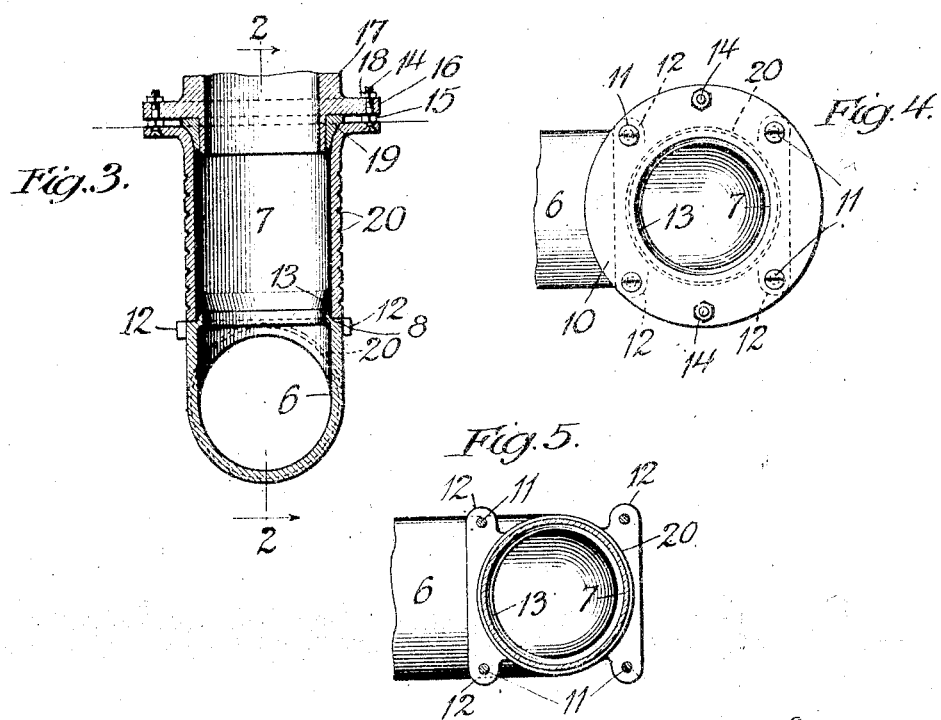
Witnesses
H. R. L. White
M. A. Kiddie
Inventor
Frank W. Carlson
By Linthicum, Belt & Fuller
Attys

UNITED STATES PATENT OFFICE.

FRANK W. CARLSON, OF CHICAGO, ILLINOIS.

CLOSET CONNECTION.

962,621.  Specification of Letters Patent.  Patented June 28, 1910.

Application filed May 19, 1909. Serial No. 496,991.

*To all whom it may concern:*

Be it known that I, FRANK W. CARLSON, a citizen of the United States, residing at Chicago, in the county of Cook and State of Illinois, have invented new and useful Improvements in Closet Connections, of which the following is a specification.

The object of this invention is to provide a stock closet connection of simple and inexpensive construction which can be easily and quickly made to fit in place beneath any floor.

In the accompanying drawings illustrating the invention Figure 1 is a side elevation. Fig. 2 is a longitudinal sectional view on the line 2—2 of Fig. 3. Fig. 3 is a transverse sectional view on the line 3—3 of Fig. 1. Fig. 4 is a top plan view of the connection. Fig. 5 is a transverse sectional view on the line 5—5 of Fig. 2.

The connection comprises a horizontal member 6 and an upright member 7, the former having a seat 8 and a flange 9 to receive the lower end of the latter. The upright member is provided with an integral flange 10 at its upper end and threaded bolts 11 engage said flange and are screwed into openings in lugs 12 integral with the horizontal member to securely fasten the two members together. A smooth and tight joint is made by iron cement 13 which is applied within the upright member at the joint with the horizontal member (Fig. 2). Threaded bolts 14 extend upward through openings in the flange 10 and are provided with lock nuts 15 which engage the upper surface of the flange to secure the bolts in place on the flange. These bolts are employed to engage the flange 16 of the closet bowl 17 and nuts 18 are screwed down on the bolts to secure the closet bowl rigidly in place on the connection. A suitable gasket 19 is arranged between the closet bowl and the upright member of the connection. Both members of the connection are provided exteriorly with a plurality of peripheral grooves, corrugations, or kerfs 20 spaced apart at suitable intervals and of sufficient depth to enable the members to be readily divided on any groove.

In practice the horizontal member is adjusted to size and set in place beneath the floor and then the upright member is likewise adjusted to size and fastened in place on the horizontal member. The upright member constitutes all that part of the connection above the horizontal part of the horizontal member and this provides a greater range of adjustment than has heretofore been possible in closet connections. The upright member can be cut down to any desired height, and, if desirable, the bolts can be cut off accordingly, but this is not necessary and may be done merely as a matter of convenience.

The connection consists of two parts and the fastening bolts and it can be readily and easily adjusted and fitted in any floor and the parts securely and tightly fastened together. My invention, therefore, enables a stock connection of simple and inexpensive construction to be set in place in any position beneath a floor and after it is once set there is no likelihood of the parts becoming loose or displaced.

In setting or fitting closet connections and in setting the closet bowl thereon it happens with more or less frequency that the connecting bolts drop out and are lost beneath the floor. By providing the lock nuts 15 in the manner herein shown and described I permanently connect the bolts 14 to the flange 10 of the upright member of the connection so that they will not be disengaged therefrom.

What I claim and desire to secure by Letters Patent is:

A closet connection consisting of a horizontal member provided at one end with fastening lugs and a seat consisting of a flat portion, a flange extending upwardly from the inner edge thereof, and having its upper outer edge chamfered off to form with an upright member a recess for the reception of cement, said upright member engaging said seat and provided at its upper end with a horizontal flange, means engaging said flange and said lugs for securing the upright and horizontal members together, a plurality of bolts extending up through said flange, and lock nuts for normally maintaining said bolts in upright position, to receive a bowl adapted to be secured thereto.

FRANK W. CARLSON.

Witnesses:
WM. O. BELT,
M. A. KIDDIE.